United States Patent [19]

Alexander et al.

[11] Patent Number: 5,250,308
[45] Date of Patent: Oct. 5, 1993

[54] FORMULATION FOR AND METHOD OF PRODUCING A FIBER FORTIFIED FOODSTUFF

[75] Inventors: Karen L. Alexander, Belmont; David S. Staley; Pari Bednarz, both of Grand Rapids, all of Mich.

[73] Assignee: Amway Corporation, Ada, Mich.

[21] Appl. No.: 807,140

[22] Filed: Dec. 13, 1991

[51] Int. Cl.$^5$ .................. A23P 1/08; A23P 1/14
[52] U.S. Cl. ........................ 426/94; 426/98; 426/292; 426/293; 426/295; 426/302; 426/303; 426/440; 426/445; 426/449; 426/808
[58] Field of Search ........... 426/93, 94, 98, 102, 426/292, 293, 295, 302, 303, 445, 559, 440, 449, 450, 808

[56] References Cited

U.S. PATENT DOCUMENTS

| | | | |
|---|---|---|---|
| 3,682,652 | 8/1972 | Corbin et al. | 426/804 |
| 4,089,984 | 5/1978 | Gilbertson | 426/293 |
| 4,251,551 | 2/1981 | VanHulle et al. | 426/94 |
| 4,259,359 | 3/1981 | Spicer | 426/62 |
| 4,315,954 | 2/1982 | Kuipers et al. | 426/583 |
| 4,350,714 | 9/1982 | Duvall | 426/559 |
| 4,438,146 | 3/1984 | Colby et al. | 426/448 |
| 4,517,204 | 5/1985 | Mottar et al. | 426/94 |
| 4,526,800 | 7/1985 | Howard | 426/559 |
| 4,565,702 | 1/1986 | Morley et al. | 426/93 |
| 4,568,557 | 2/1986 | Becker et al. | 426/618 |
| 4,619,831 | 10/1986 | Sharma | 426/93 |
| 4,623,550 | 11/1986 | Willard | 426/559 |
| 4,673,578 | 6/1987 | Becker et al. | 426/93 |
| 4,734,289 | 3/1988 | Yamaguchi et al. | 426/302 |
| 4,777,045 | 10/1988 | Vanderveer et al. | 426/72 |
| 4,834,996 | 5/1989 | Fazzolare et al. | 426/549 |
| 4,938,982 | 7/1990 | Howard | 426/559 |
| 4,961,943 | 10/1990 | Blanthorn et al. | 426/303 |
| 4,985,269 | 1/1991 | Irvin et al. | 426/560 |
| 5,024,996 | 6/1991 | Ringe | 426/560 |

*Primary Examiner*—Helen F. Pratt
*Attorney, Agent, or Firm*—Willian Brinks Olds Hofer Gilson & Lione

[57] ABSTRACT

A process for manufacturing a fiber fortified foodstuff that includes preparing the foodstuff and then topically applying supplemental fiber. In particular, puffed snack products are prepared by mixing cereal with a fiber premix and sufficient moisture to form an extrudable dough base. The dough base is cooked in a cooking extruder and then extruded to form a wet puff which is dried and then coated with an oil slurry. A flavor premix which includes supplemental dietary fiber, particularly a soluble fiber, is topically applied to the oil coated dry puff to form a fiber fortified, puffed snack product.

23 Claims, No Drawings

FORMULATION FOR AND METHOD OF PRODUCING A FIBER FORTIFIED FOODSTUFF

BACKGROUND OF THE INVENTION

The present invention relates to a process for manufacturing fiber fortified foodstuffs and to products produced by the process.

There is a tremendous consumer interest in foodstuffs that are lower in fat. At the same time, there is an increased consumer awareness of the benefits associated with the consumption of dietary fiber. Such benefits include the normalization of the bowel function and the reduction in the occurrence of certain colonic diseases. Increased dietary fiber intake has been used in the treatment for diabetes, hypoglycemia, hypercholesterolemia, hypertriglyceridemia. Dietary fiber has also been used as a control for metabolic rates to help prevent obesity.

Various foodstuffs, such as breakfast cereals have been modified to include a greater dietary fiber content. In addition, consumers have looked to snack and convenience foods to provide increased fiber in their diet. In particular, puffed snack food products are popular consumer items for which there exists a great demand.

The general preparation of snack products and ready to eat cereals is well known to those skilled in the art. U.S. Pat. No. 4,526,800, incorporated herein by reference, notes the following processes for preparing expanded snackfoods: (a) a dry collet process, (b) frying a wet completely gelatinized dough, and (c) frying a wet dough containing some ungelatinized starch.

U.S. Pat. Nos. 3,682,652 and 4,985,269, both of which are incorporated herein by reference, disclose processes for the manufacture of chips. The preparation of ready-to-eat cereals is described in U.S. Pat. No. 5,024,996 incorporated herein by reference.

Puffed snack foods are generally made from a mixture containing meal or flour and other ingredients. Water is added to the mixture to form a dough that is cooked in a cooking extruder to a temperature and pressure at which the dough will expand or "puff" upon reaching atmospheric pressure after extrusion. The extrudate or wet puff is cut to the desired shape and then dried to reduce its moisture content.

It is well known to those skilled in the art to then flavor the dry puff using an oil slurry containing flavoring (e.g., cheese and salt) to produce the final product. Alternatively, U.S. Pat. No. 4,517,204 to Mottur et al., discloses that when cheese and salt are used as a flavoring, the oil can be sprayed onto the dry puff first and then a flavor mixture of cheese and salt can be dusted onto the oil coated puff. This two-step spraying and dusting method is stated to provide an improved cheese flavor over conventional flavor containing oil slurry methods while at the same time reducing the oil content and thus, the calories, of the final product.

Although the processes for manufacturing low fiber snack products and ready-to-eat cereals are well known, there exists a need for fiber fortified foodstuffs and in particular fiber fortified snacks and ready-to-eat cereals that have an acceptable taste. Several alternatives have been suggested for incorporating fiber into snack products and ready-to-eat cereals. For example, U.S. Pat. No. 5,024,996 to Ringe discloses a ready-to-eat cereal supplemented with a highly concentrated soluble fiber source so that the cereal contains at least 10% soluble fiber and the ratio of soluble to insoluble fiber ranges from about 0.5:1 to 3:1.

U.S. Pat. No. 4,517,204 to Mottur et al. discloses a reduced calorie puffed snack food in which microcrystalline cellulose ("MCC") coated with a hydrophilic polysaccharide is mixed with a puff extrudable meal or flour to provide a final product containing about 16% dietary fiber.

U.S. Pat. No. 4,568,557 to Becker et al. describes a snack food which has added dietary fiber at a level of between 5 and 30 percent. In the method described therein, the dietary fiber is soaked in a food grade oil before being incorporated into a granola type bar. This soaking by oil is stated to improve the texture and mouthfeel of the granola bar.

U.S. Pat. No. 4,619,831 to Sharma describes a method of preparing supplemental dietary fiber for inclusion in products such as snack bars. According to the method described, insoluble dietary fiber is enrobed in soluble dietary fiber. This method is also stated to improve the texture and mouthfeel of the products into which the supplemental dietary fiber is incorporated.

In each of these alternatives, the fiber is incorporated with the substrate, base, or dough. Unfortunately, doughs high in fibers are difficult to manufacture because they can absorb undesirably high amounts of moisture during processing. Also, they can develop very high viscosities. In addition, the added fiber can adversely inhibit the expansion and detrimentally affect the texture and flavor of an extruded puffed product. Accordingly, there exists a need for foodstuffs, and in particular, puffed products having added fiber and a desirable taste and texture.

SUMMARY OF THE INVENTION

Briefly stated, the present invention is a fiber fortified foodstuff and a process for manufacturing the fiber fortified foodstuff. The foodstuff can include grain based products, nuts, seeds, dried fruits and the like. The process for manufacturing the fiber fortified foodstuff includes topically applying supplemental fiber to the prepared foodstuff.

Particularly, the invention relates to a fiber fortified snack product in which supplemental fiber is topically applied to the snack product. The snack product has a total dietary fiber content of at least about 10 percent by weight. The method of making the snack product of the present invention includes the steps of producing an extruded dry snack product and topically applying supplemental fiber to the extruded dry snack product.

In any of several embodiments, the supplemental fiber can be topically applied by itself or can be included with other components that are topically applied such as, but not limited to, an oil slurry, a flavor premix, or a flavored oil slurry. For example, in one embodiment, the supplemental fiber can be included in a flavored oil slurry which is used to coat the extruded dry snack product. In another embodiment, the supplemental fiber can be included in an oil slurry used to coat the extruded dry snack product and then the flavor premix can be topically applied to the coated dry snack product. In another embodiment, the extruded dry snack product can be first coated with an oil slurry and then a flavor premix that includes supplemental fiber can be topically applied. In another embodiment, the fiber is not incorporated with the oil slurry or flavor premix but can be topically applied as a distinct step, preferably after the dry product has been coated with oil.

A preferred method of making the snack product of the present invention includes the steps of introducing into a cooking extruder a base and sufficient moisture to form an extrudable dough base; cooking the dough base in the cooking extruder; extruding the dough base from the cooking extruder to form a wet product; drying the wet product to reduce its moisture content; coating the dry product with an oil slurry; and topically applying the coated dry product with a flavor premix that includes supplemental dietary fiber.

In accordance with a more preferred embodiment of the invention, the snack product is a fiber fortified, puffed snack food product that comprises a base including a cereal and a fiber premix. The base is cooked, extruded to form a wet puff, dried, and coated with an oil slurry that includes an edible oil. A flavor premix that includes supplemental dietary fiber is then topically applied to the oil coated puff.

The method of making the puff product comprises preparing a dry puff and then topically applying supplemental fiber. More particularly, the method includes the steps of introducing into a cooking extruder a base that includes a cereal and a fiber premix and sufficient moisture to form an extrudable dough base; cooking the dough base in the cooking extruder under conditions so that the dough base will expand or puff upon extrusion; extruding the dough base from the cooking extruder to form wet puffs; drying the wet puffs to reduce their moisture content; coating the dry puffs with an oil slurry; and topically applying a flavor premix that includes supplemental dietary fiber to the coated dry puffs.

In accordance with the most preferred embodiment of the invention, the base constitutes about 58% of the puffed snack. The base comprises about 85% of a cereal and about 15% of a fiber premix. The cereal is an edible meal, of any suitable granulation, or flour that is derived from corn, rice, oats, barley, wheat, potatoes, legumes, and the like. In this embodiment, the fiber premix comprises a mixture of soluble and insoluble fiber. This embodiment also includes about 20 percent of an oil slurry comprising an edible oil and optionally, flavor ingredients. This preferred embodiment further includes a flavor premix that includes about 25% of supplemental dietary fiber.

The term "dietary fiber" has been defined as the indigenous components of plant materials in the diet which are resistant to digestion by enzymes produced by humans. Stated another way, dietary fiber is the sum of all polysaccharides and lignin that are not digested by the secretions of the human digestive tract. It is noted that, although the term "fiber" generally refers to filamentous, stringy materials, "dietary fiber" is often gelatinous or mucilaginous in character.

It is noted that the term "supplemental dietary fiber," as used in this specification and the appended claims, is intended to refer to dietary fiber which is added to the ingredients comprising the final product apart from the fiber which is naturally included as part of the product. The supplemental fiber includes that fiber present in the fiber premix as well as the topically applied supplemental fiber.

In the same regard, it is noted that the term "wet product" or "wet puff" refers to the product after the dough base has been extruded and shaped or cut. The term "dry product" or "dry puff" refers to the product after it has been dried to reduce its moisture content.

It is also noted that, unless otherwise stated, all percentages given in this specification and the appended claims refer to percentages by weight.

The present invention is advantageous in that it can provide a foodstuff which is fortified with dietary fiber yet have a pleasing taste comparable to lower fiber commercial foodstuffs. In particular, the present invention is advantageous in that it provides a reduced fat, fiber fortified, puffed snack product. Although the addition of supplemental fiber and the reduction in the amount of fat used would otherwise typically result in a product with poor mouthfeel and taste, it has been found that the method of the present invention results in a puffed snack product comparable to commercial puffed products. This is true because supplemental dietary fiber is incorporated with the base as well as being topically applied. As a result, the problems associated with extruding a dough containing added fiber are avoided while a fiber fortified snack product with desired taste and texture can be made.

These and other objects, advantages, and features of the present invention will be better understood upon review of the following detailed description of the preferred embodiments.

DETAILED DESCRIPTION OF THE PREFERRED EMBODIMENTS

The most preferred embodiment will be described in detail first. Subsequently, other preferred embodiments will be described.

According to the most preferred embodiment, an extruded puffed product is made by combining, in a cooking extruder, a base with a sufficient amount of moisture to form an extrudable dough base. The dough base is cooked and then extruded into a desired wet puff shape. The wet puff is dried, coated with an oil slurry, and then a flavor premix that includes supplemental fiber is topically applied to the oil coated dry puff.

The base is a mixture of a cereal and a fiber premix. The cereal is an edible meal or flour which is well known to those skilled in the art. Any typical granulation of the cereal is acceptable. Preferably, the cereal is a meal, of any suitable granulation, or flour selected from the group consisting of corn, oats, rice, wheat, barley, potatoes, legumes, and the like, and mixtures thereof. More preferably, the cereal is selected from the group consisting of corn meal, snack meal, corn flour, and mixtures thereof. In accordance with the most preferred embodiment yellow corn meal is used.

The cereal constitutes from about 41% to about 57% by weight of the puffed snack product. Preferably, the cereal constitutes from about 45% to about 53% by weight of the puffed snack product. More preferably, the cereal constitutes about 49% of the puffed snack product.

The fiber premix can be any one of various types of dietary fiber and is selected so as to not adversely impact the taste and texture of the final product. Preferably, a mixture of various types of dietary fiber is used. More preferably, the fiber premix is a mixture of soluble and insoluble fiber.

Because the cereal contributes some dietary fiber, the amount of dietary fiber contributed by the fiber premix to the base will vary depending on the cereal selected. In the most preferred embodiment, the cereal contributes up to about 2% of the dietary fiber in the base and the fiber premix contributes the balance.

Various techniques are available for measuring the dietary fiber content of food products. A suitable technique is an enzymatic gravimetric method designated by the Association of Official Analytical Chemists as #43.A14-43.A20. The base and the entire puffed snack can be analyzed by a method such as this. Alternatively, the total dietary fiber content of the base or the puffed snack can be calculated by determining the dietary fiber contents of the individual ingredients.

Although sources of supplemental dietary fiber can contribute both soluble and insoluble fiber, sources generally known to contribute insoluble fiber include but are not limited to cereal brans, soy fiber, oat fiber, pectins, corn bran, wheat bran, oat bran, barley bran, rye bran, triticale bran, cellulose, apple fiber, pea fiber, sugar beet fiber, and peanut fiber. Sources generally known to contribute soluble fiber include but are not limited to gum arabic, gum ghatti, guar gum, carboxymethyl cellulose, conjac mannon, psyllium, carrageenans, xanthan, tragacanth, karaya, locust bean gum, agar, and alginates. Of these sources of supplemental dietary fiber, soy fiber, oat fiber, corn bran, wheat bran, barley bran, rye bran, oat bran, cellulose, guar gum, gum arabic, gum ghatti, locust bean gum, karaya, and xanthan are preferred. Soy fiber, corn bran, oat fiber and gum arabic are the most preferred.

In accordance with the present invention, the fiber premix is incorporated with the cereal in an amount such that the dietary fiber content of the base is at least about 5 percent. Preferably, the fiber premix is incorporated with the cereal in an amount such that the dietary fiber content of the base is from about 8% to about 20%. More preferably, the fiber premix is incorporated with the cereal in an amount such that the dietary fiber content of the base is about 15%.

Preferably, the fiber premix consists of gum arabic added at from about 1% to about 8% of the base and from about 0.8% to about 4% of the puffed snack; corn bran added up to about 8% of the base and up to about 4% of the puffed snack; soy fiber added up to about 14% of the base and up to about 8.5% of the puffed snack; oat fiber added up to about 1% of the base and up to about 0.5% of the puffed snack.

In the most preferred embodiment, the fiber premix consists of gum arabic added at about 6.5% of the base and at about 4% of the puffed snack; corn bran added at about 4% of the base and at about 2% of the puffed snack; soy fiber added at about 3% of the base and at about 2% of the puffed snack; oat fiber added at about 1% of the base and at about 0.5% of the puffed snack.

The fiber premix and cereal are combined and then metered into the cooking extruder where they are intimately mixed with added moisture to form an extrudable dough base. Alternatively, the cereal can be metered into the extruder and the ingredients comprising the fiber premix can be mixed and then metered into the extruder separate from the cereal. The dough base is cooked under temperatures and pressures that result in the expansion (puffing) of the dough base upon reaching atmospheric pressure when extruded.

It is important that care be taken to avoid high shear mixing of the base, especially during dough formation. That is, during mixing and cooking, only low shear blending should be used. Thus, those preparation methods and equipment designed to provide high shear cooking of doughs are, in preferred embodiments, to be avoided. A twin screw extruder with a low shear profile is most preferred.

The dough base is extruded through dies which aid in accomplishing the expansion of the dough base into wet puffs of a spherical shape although other shapes may be created. Where other shapes are created by the die, the extrudate may be cut and shaped as desired.

Puff extrusion cooking conditions are well known in the art, and in the preferred embodiment they include extruder barrel temperatures of about 275° F. and pressures of from about 400 to about 800 pounds per square inch at the outlet of the extruder.

The wet puffs generally have a moisture content of from about 10% to about 25% by weight. Preferably, about 20% by weight. Accordingly, after any shaping or sizing the wet puffs are partially dried to obtain the desired moisture content. Generally, the wet puffs are dried to a moisture content of less than about 5% by weight. Any conventional method of drying can be used to reduce the moisture content of the wet puffs. For example, frying, baking, air drying, and the like can be used. Air drying and baking are preferred over frying because the oil which frying necessarily imparts to the wet puffs during the frying process adds to the fat content and thus the calories of the final puffed snack product. More preferably, air drying is used.

Preferably, the wet puffs are dried until their moisture content is reduced to about 2% by weight. The puffs are preferably air dried at a temperature within the range of from about 200° F. to about 450° F., most preferably from about 240° F. to about 270° F.

The dry puffs are then coated with an oil slurry. The coating can be by any of the methods in the snack and food art that are well known to those skilled in the art. Preferably, the oil slurry is sprayed onto the dry puffs. The oil slurry consists of an edible oil and may include flavor ingredients which can be any of the well-known flavoring materials that are incorporated in the flavor premix. The oil slurry may also include supplemental fiber.

The edible oil can be any conventional oil well known to those skilled in the snack and food art. Suitable edible oils include any of the vegetable oils such a coconut, canola, palm kernel, corn, peanut, cottonseed, soybean, sesame, and sunflower oil and mixtures thereof. Preferably, the vegetable oils are hydrogenated to a melting point between about 70° F. to about 105° F. Most preferably, a vegetable oil having a melting point of about 95° F. is used. In accordance with the most preferred embodiment, a hydrogenated sunflower oil having a melting point of about 95° F. is used.

The oil slurry consists of an edible oil present from about 90% to about 100% of the oil slurry and from about 10% to about 30% of the puffed snack; and flavor ingredients present from about 0% to about 10% of the oil slurry and from about 0% to about 7% of the puffed snack. Preferably, the oil slurry consists of an edible oil present from about 15% to about 25% of the puffed snack and flavor ingredients present at up to about 3% of the puffed snack. More preferably, the oil slurry consists of an edible oil added at about 95% of the oil slurry and at about 20% of the puffed snack; and flavor ingredients added at up to about 5% of the oil slurry and at up to about 1% of the puffed snack.

Coating with the oil slurry advantageously provides a reduction in fat content while providing a fatty mouthfeel. In addition, the oil slurry provides a means to adhere the flavor premix or the topically applied supplemental fiber to the oil coated dry puffs. Moreover, a suitable oil slurry coating contributes to an extension in the shelf life of the product. The coated dry puffs are allowed a minimal period in which to absorb the oil prior to topically applying the supplemental fiber or flavor premix.

The flavor premix can consist of any well known flavoring materials such as natural and artificial, flavors, seasonings blends, salt and the like. For example, the flavors can include but are not limited to corn flavors, fat flavors, cheese flavors barbecue seasoning flavor, ranch-type flavor, nacho cheese flavor and the like.

The flavoring materials can be dry, liquid, or paste-type. The flavoring can be incorporated internally in the base, the oil slurry or applied topically with the flavor premix. Preferably, the flavor premix is applied topically. Any method for topically applying a liquid or powder can be used. More preferably, the flavor premix is a powder and is dusted onto the oil coated dry puffs.

Preferably, the flavor premix contains supplemental dietary fiber. The supplemental dietary fiber may include any of the fibers described above. Preferably, a soluble fiber is used. More preferably, a low viscosity soluble fiber is used. Most preferably, gum arabic is used. The supplemental fiber is present at up to about 37% of the flavor premix and up to about 8% of the puffed snack product. Preferably, the supplemental fiber is present at about 25% of the flavor premix and at about 5% of the puffed snack product.

In accordance with the most preferred embodiment, the flavor premix includes gum arabic, cheese flavors, and salt. The gum arabic is added at a level of about 25% of the premix and at about 5% of the puffed snack. Typical cheese flavors include white cheddar, mild cheddar, sharp cheddar, swiss, and blue. In the most preferred embodiment, the cheese flavors consist of a compound natural and artificial cheese flavor added at about 34% of the premix and at about 7% of the puffed snack product; a natural cheese flavor added at about 8.5% of the premix and at about 2% of the puffed snack; a cheddar cheese powder at about 8.5% of the premix and at about 2% of the puffed snack; a processed cheese powder at about 17% of the premix and at about 4% of the puffed snack; and salt at about 9% of the premix and at about 2% of the puffed snack.

In accordance with the most preferred method, a puffed snack product is produced generally having an inner core comprising a base, an intermediate layer comprising an oil slurry, and an outer layer comprising a flavor premix that includes supplemental fiber. The base comprises a cereal and a fiber premix. The oil slurry comprises an edible oil and, optionally flavoring. In particular, the puffed snack product has an inner core comprising an extruded puffed base that includes a cereal and a fiber premix, an intermediate layer comprising an oil slurry that includes an edible oil, and an outer layer comprising a flavor premix that includes supplemental fiber.

It is to be understood that the intermediate oil slurry layer may penetrate the porous structure of the base to some degree and that the outer flavor premix layer will be incorporated to some degree in the intermediate oil slurry layer. Although the layers may not be visually detectable, it is understood that in the method of producing the most preferred puffed snack generally three layers are created.

In this most preferred embodiment, an analysis of the puffed snack reveals that the puffed snack product contains about 25% less fat compared to commercial products while having a minimum of 3 grams of dietary fiber per one ounce of the puffed snack product. The analysis used to measure the dietary flavor is an enzymatic gravimetric method designated by the Association of Official Analytical Chemists as #43.A14-43.A20. The puffed snack made according to this most preferred embodiment has a texture and taste remarkably similar to commercial lower fiber, higher fat, puffed snack products.

Although the supplemental fiber is included in the flavor premix in the most preferred embodiment, the supplemental fiber may be applied as a distinct step in the process or may be incorporated in the oil slurry. For example, in one embodiment, the dry puff can be coated with an oil slurry in which supplemental fiber is incorporated. In this embodiment, the flavor premix may also be incorporated in the oil slurry or may be applied after the dry puff has been coated. The supplemental fiber may also be applied as a distinct step. For example, the oil coated dry puff may have the supplemental fiber applied and then have the flavor premix applied. Alternatively, the flavor premix may be applied before the supplemental fiber.

Another embodiment of the invention comprises topically applying supplemental fiber to foodstuffs which include grain based products, nuts, seeds, and dried fruits. Such grain based products can include but are not limited to chips made from corn, wheat, and the like; potato chips; pop corn; puffed products; gun puffed products; cereals including ready-to-eat, flaked, puffed, and gun puffed; hot cereals, including oatmeal and quick oatmeals; crackers; croutons; and the like. These grain based products may be extruded and then dried by frying, baking, or air drying to reduce the moisture content as is well known to those skilled in the art.

After these products have been processed, as is well known, supplemental fiber can be topically applied to increase the total dietary fiber content of the product. Such supplemental fiber can include the insoluble and soluble fibers described above.

For example, after these products have been dried they may be coated with a flavored oil slurry in which supplemental fiber is incorporated. Alternatively, the dried products can be coated with an oil and then dusted with a flavor premix in which supplemental fiber is incorporated. The dried products could also be coated with an oil slurry, dusted with flavoring, and then supplemental fiber could be topically applied. Accordingly, a fiber fortified foodstuff can be produced.

Alternatives to an oil slurry may also be used which would also act as an adhesive for the topically applied supplemental fiber. These alternatives include, but are not limited to, a carbohydrate slurry made from a low dextrose equivalent maltodextrin, a protein slurry made from a low viscosity hydrolyzed gelatin, and a fiber slurry made from a low viscosity soluble gum such as gum arabic. Combinations of these may also be used. Generally, if a carbohydrate slurry, a protein slurry, or a fiber slurry are used, then the coated product is dried to reduce the moisture of the coated product prior to topically applying the supplemental fiber.

EXAMPLES

The following examples are provided by way of explanation and description and should not be seen as limiting the scope of the invention.

Example 1 was carried out according to the most preferred embodiment, i.e., with the most preferred formulation and the most preferred method.

Example 1 - Cheese Flavor

| Ingredient | Percent of Puffed Snack |
|---|---|
| Base | |
| Cereal | 48.99 |
| (Corn Meal-yellow) | |
| Fiber Premix | |
| (Gum Arabic) | 3.78 |
| (Corn Bran) | 2.36 |
| (Soy Fiber) | 1.97 |
| (Oat Fiber) | 0.41 |
| Oil Slurry | 20.00 |
| Hydrogenated | |
| Vegetable Oil | |
| (Sunflower Oil) | |
| Flavor | 1.00 |
| (Natural Fried Fat Flavor) | |
| Flavor Premix | 5.00 |
| Supplemental Fiber | |
| (Gum Arabic) | |
| Flavor Ingredients | |
| (Natural and Artificial Cheese Flavor) | 7.25 |
| (Natural Cheese Flavor) | 1.81 |
| (Cheddar Cheese Powder) | 1.81 |
| (Process Cheese Powder) | 3.62 |
| (Salt) | 2.00 |
| | 100.00 |

The puffed snack according to Example 1 has a texture and flavor which is comparable to commercial low fiber, higher fat puffed snack products. Taste panel testing indicated a high degree of acceptability with ratings of 6.9 for flavor acceptability and 7.2 for texture acceptability on a 1 to 9 hedonic scale. When the ratings for the product made according to Example 1 were compared to the ratings for a commercial low fiber, higher fat puffed snack, there was no statistically significant difference, at the 95% confidence level, between the two.

Examples 2-4 were carried out according to the most preferred method but the formulation was varied to produce a puffed snack with different flavors.

Example 2 - Ranch Flavor

| Ingredient | Percent of Puffed Snack |
|---|---|
| Base | |
| Cereal | 51.280 |
| (Corn Meal-yellow) | |
| Fiber Premix | |
| (Gum Arabic) | 3.955 |
| (Corn Bran) | 2.468 |
| (Soy Fiber) | 2.065 |
| (Oat Fiber) | 0.427 |
| Oil Slurry | 20.00 |
| (Sunflower Oil) | |
| Flavor Premix | 6.00 |
| Gum Arabic | |
| Buttermilk Powder | 4.00 |
| Sour Cream Powder | 4.00 |
| Salt | 1.80 |
| Flavors | 3.52 |

Example 2 - Ranch Flavor (continued)

| Ingredient | Percent of Puffed Snack |
|---|---|
| Tomato Powder | 0.80 |
| Parsley | 0.60 |
| Spice | 0.075 |
| | 100.000 |

Example 3 - Nacho Cheese Flavor

| Ingredient | Percent of Puffed Snack |
|---|---|
| Base | |
| Cereal | 49.37 |
| (Corn Meal-yellow) | |
| Fiber Premix | |
| (Gum Arabic) | 3.81 |
| (Corn Bran) | 2.37 |
| (Soy Fiber) | 1.99 |
| (Oat Fiber) | 0.41 |
| Oil Slurry | 20.00 |
| (Sunflower Oil) | |
| Flavor Premix | 5.00 |
| Gum arabic | |
| Nacho seasoning blend | 10.00 |
| Cheese powder | 6.00 |
| Tomato powder | 1.00 |
| Flavors | 0.05 |
| | 100.00 |

Example 4 - Pizza Flavor

| Ingredient | Percent of Puffed Snack |
|---|---|
| Base | |
| Cereal | 48.98 |
| (Corn Meal-yellow) | |
| Fiber Premix | |
| (Gum Arabic) | 3.78 |
| (Corn Bran) | 2.36 |
| (Soy Fiber) | 1.97 |
| (Oat Fiber) | 0.41 |
| Oil Slurry | 20.00 |
| (Sunflower Oil) | |
| Flavor Premix | 5.00 |
| Gum arabic | |
| Pizza seasoning blend | 10.00 |
| Cheese powder | 4.00 |
| Flavors | 2.00 |
| Salt | 1.50 |
| | 100.00 |

Of course, it should be understood that a wide range of changes and modifications can be made to the embodiments described above. It is therefore intended that the foregoing description illustrates rather than limits this invention, and that it is the following claims, including all equivalents, which define this invention.

We claim:

1. A method of making a fiber fortified extruded puffed snack comprising:

a. preparing a dry puff having a moisture content of less than about 5 percent by weight from a base comprising a cereal and a fiber premix such that the dietary fiber content of the base is at least about 5 percent by weight;

b. coating the dry puffs with an oil slurry comprising from about 90 to about 100 percent by weight of an edible oil and from about 0 to about 10 percent by weight of flavor ingredients; and, c. topically applying a flavor premix that includes supplemental fiber present at up to about 37 percent by weight of the flavor premix.

2. The method of claim 1 wherein the base comprises an amount of fiber premix such that the dietary fiber content of the base is from about 8 to about 20 percent by weight.

3. The method of claim 2 wherein the fiber premix is selected from the group consisting of gum arabic, corn bran, soy fiber, oat fiber, and mixtures thereof.

4. The method of claim 3 wherein the fiber premix comprises;
a. from about 1 to about 8 percent by weight of the base of gum arabic;
b. up to about 8 percent by weight of the base of corn bran;
c. up to about 14 percent by weight of the base of soy fiber; and,
d. up to about 1 percent by weight of the base of oat fiber.

5. The method of claim 1 wherein the supplemental fiber in the flavor premix is a soluble fiber present at about 25 percent by weight of the premix.

6. The method of claim 1 wherein the oil slurry is sprayed onto the dry puff to achieve at total oil content of from about 10 to about 30 percent by weight of the puffed snack.

7. A method of making a fiber fortified extruded puffed snack comprising:
a. preparing a dry puff having a moisture content of less than about 5 percent by weight from a base comprising a cereal and a fiber premix such that the dietary fiber content of the base is from about 8 to about 20 percent by weight;
b. coating the dry puffs with an oil slurry comprising from about 90 to about 100 percent by weight of an edible oil and from about 0 to about 10 percent by weight of flavor ingredients; and,
c. topically applying a powdered flavor premix that includes supplemental fiber comprising a soluble fiber present at about 25 percent by weight of the flavor premix.

8. The method of claim 7 wherein the base comprises an amount of fiber premix such that the dietary fiber content of the base is about 15 percent by weight.

9. The method of claim 7 wherein the fiber premix is selected from the group consisting of gum arabic, corn bran, soy fiber, oat fiber, and mixtures thereof.

10. The method of claim 9 wherein the fiber premix comprises:
a. about 6.5 percent by weight of the base of gum arabic;
b. about 4 percent by weight of the base of corn bran;
c. about 3 percent by weight of the base of soy fiber; and,
d. about 1 percent by weight of the base of oat fiber.

11. The method of claim 10 wherein the supplemental fiber in the flavor premix is a low viscosity soluble fiber present at about 25 percent by weight of the premix.

12. The method of claim 11 wherein the supplemental fiber is gum arabic.

13. A fiber fortified puffed snack product comprising:
a. an inner core comprising a base having a moisture content of less than about 5 percent by weight and comprising a cereal and a fiber premix such that the dietary fiber content of the base is at least about 5 percent by weight;
b. an intermediate layer comprising an oil slurry comprising from about 90 to about 100 percent by weight of an edible oil and from about 0 to about 10 percent by weight of flavor ingredients; and,
c. an outer layer comprising a flavor premix wherein the flavor premix includes supplemental fiber present at up to about 37 percent by weight of the flavor premix.

14. The product of claim 13 wherein the base comprises an amount of fiber premix such that the dietary fiber content of the base is from about 8 to about 20 percent by weight.

15. The product of claim 14 wherein the fiber premix is selected from the group consisting of gum arabic, corn bran, soy fiber, oat fiber, and mixtures thereof.

16. The product of claim 15 wherein the fiber premix comprises;
a. from about 1 to about 8 percent by weight of the base of gum arabic;
b. up to about 8 percent by weight of the base of corn bran;
c. up to about 14 percent by weight of the base of soy fiber; and,
d. up to about 1 percent by weight of the base of oat fiber.

17. The method of claim 16 wherein the supplemental fiber in the flavor premix is a soluble fiber present at about 25 percent by weight of the premix.

18. A fiber fortified puffed snack product comprising:
a. an inner core comprising a base having a moisture content of less than about 5 percent by weight and comprising a cereal and a fiber premix such that the dietary fiber content of the base is from about 8 to about 20 percent by weight;
b. an intermediate layer comprising an oil slurry comprising from about 90 to about 100 percent by weight of an edible oil and from about 0 to about 10 percent by weight of flavor ingredients; and,
c. an outer layer comprising a flavor premix wherein the flavor premix includes supplemental fiber comprising a soluble fiber present at about 25 percent by weight of the flavor premix.

19. The product of claim 18 wherein the base comprises an amount of fiber premix such that the dietary fiber content of the base is about 15 percent by weight.

20. The product of claim 19 wherein the fiber premix is selected from the group consisting of gum arabic, corn bran, soy fiber, oat fiber, and mixtures thereof.

21. The product of claim 20 wherein the fiber premix comprises;
a. about 6.5 percent by weight of the base of gum arabic;
b. about 4 percent by weight of the base of corn bran;
c. about 3 percent by weight of the base of soy fiber; and,
d. about 1 percent by weight of the base of oat fiber.

22. The product of claim 21 wherein the supplemental fiber in the flavor premix is a low viscosity soluble fiber present at about 25 percent by weight of the premix.

23. The product of claim 22 wherein the supplemental fiber is gum arabic.

* * * * *

UNITED STATES PATENT AND TRADEMARK OFFICE
CERTIFICATE OF CORRECTION

PATENT NO. : 5,250,308
DATED : October 5, 1993
INVENTOR(S) : Karen L. Alexander et al.

It is certified that error appears in the above-indentified patent and that said Letters Patent is hereby corrected as shown below:

<u>IN THE TITLE PAGE</u>

In column 1 under "[56] References Cited U.S. PATENT DOCUMENTS", eighth reference, delete "Mottar et al." and substitute "Mottur et al.".

Signed and Sealed this

Eleventh Day of October, 1994

Attest:

BRUCE LEHMAN

*Attesting Officer*       *Commissioner of Patents and Trademarks*